United States Patent [19]

Cohen et al.

[11] Patent Number: 4,988,163
[45] Date of Patent: Jan. 29, 1991

[54] INFRARED LASER SYSTEM FOR SURGICAL PURPOSES EMPLOYING COMPOUND FIBER PROBE

[75] Inventors: Martin G. Cohen, Northport; William I. Kern, Smithtown; Stephen Trokel, New York, all of N.Y.

[73] Assignee: Quantronix Corp., Smithtown, N.Y.

[21] Appl. No.: 395,342

[22] Filed: Aug. 17, 1989

[51] Int. Cl.⁵ .......................... G02B 6/02; G02B 6/16; A61B 1/00
[52] U.S. Cl. ..................... 350/96.29; 128/4; 606/15
[58] Field of Search ............... 350/96.24, 96.25, 96.26, 350/96.28, 96.29; 606/15, 16; 128/4, 5, 6

[56] References Cited

U.S. PATENT DOCUMENTS

| | | | |
|---|---|---|---|
| 4,273,109 | 6/1981 | Enderby | 128/6 |
| 4,589,404 | 5/1986 | Barath et al. | 128/6 |
| 4,669,818 | 6/1987 | Myer | 350/96.20 |
| 4,695,697 | 9/1987 | Kosa | 350/96.26 X |
| 4,760,840 | 8/1988 | Fournier, Jr. et al. | 128/303.1 |

*Primary Examiner*—Akm Ullah
*Attorney, Agent, or Firm*—Darby & Darby

[57] ABSTRACT

A low energy laser system for surgical purposes, in particular, ophthalmic surgery, comprises a source of pulsed laser energy. Er:YAG lasers having a wavelength of 3 microns are preferred. Optical fibers which are responsive to the laser energy deliver amounts of the laser energy to selected body tissue sufficient to perform delicate surgical procedures without adverse biological or chemical interaction with the tissue. In particular, a compound fiber assembly is preferred for delivery of laser energy having a wavelength above 2 microns which compound fiber comprises an elongated fiber body comprised of fluoride based glass, a surgical optical fiber-tip of a hard, moderately transparent mineral, such as quartz or sapphire, and an element for coupling the optical fiber tip to the fluoride glass body.

18 Claims, 1 Drawing Sheet

4,988,163

INFRARED LASER SYSTEM FOR SURGICAL PURPOSES EMPLOYING COMPOUND FIBER PROBE

BACKGROUND OF THE PRESENT INVENTION

1. Field of the Invention

The present invention relates to a laser system for surgery, particularly ophthalmic surgery, employing fiber optics for directing laser energy to the body. More particularly, the invention relates to the use of a laser in the mid-infrared wavelengths for providing low laser energy through a compound optical fiber arrangement for ophthalmic and other surgical purposes.

2. Background Prior Art

Devices have long been sought for the removal of intraocular pathological tissue and for fragmentation and liquefaction of eye lenses by the use of relatively low energies, particularly for removal of cataracts. One known device, a Kelman Phakomulsifier, has been used by eye surgeons in the removal of cataracts from the eye and an ocutone has been used to cut vitreous strands and membranes.

The Kelman Phakomulsifier which functions by the mechanical lysis of the lens has certain limitations in its use relating to (1) the amplitude of the shockwave introduced in the eye, (2) the amount of aspiration required to remove a fragmented lens, (3) the amount of energy placed in the eye and (4) the general dispersion of the energy in the eye.

The ocutone and other available vitrectomy devices also rely on mechanical action. Sectioning of vitreous strands and removal of membranes is accomplished using miniature oscillating or rotating surgical blades. Accurate positioning of these instruments with respect to these often diaphanous bands is particularly difficult, as is operation on membranes adjacent to the retina.

Applicants have discovered that laser energy, even low energies, at wavelengths above 1.8 microns and, in particular, the energy at the wavelength of a holmium (Ho:YAG) laser, approximately 2 microns and the energy at the wavelength of an Er:YAG laser, approximately 3 microns, are especially useful in ophthalmic surgery.

The present invention is based in part on this discovery and in part on the development of an adequate optical system for delivery of these energies to the operative site.

Providing a delivery system for 3 micron laser energy immediately encounters certain obstacles. A fiber optic delivery approach would be preferred for simplicity and directivity of the energy and fluorozirconate or fluoride glass fiber would be the optic element of choice. Fluoride glass fiber is, however, relatively fragile, toxic to tissue and reactive in water. While the fluoride glass fiber may be jacketed for support and hermetically-sealed to prevent contact with water, the resultant fiber may be too thick and cumbersome for delicate eye surgery.

Quartz fiber, while known to be non-toxic, rugged and useful for visible and near infrared applications, is generally considered as being unusable for transmission of light beyond 2.4 microns because of its large attenuation of laser energy at these wavelengths.

It is known from the prior art (U.S. Pat. No. 4,273,109) to employ two interconnected fibers having different diameters for the transmission of laser energy in surgical situations. It is also known to employ a protective sheath around optical fiber for hermetic sealing purposes (U.S. Pat. No. 4,669,818).

OBJECTS OF THE INVENTION

An object of the invention is the provision of a laser system for ophthalmic and other delicate surgery procedures employing low laser energies.

Another object of the invention is to provide a useful surgical system to implement applicants' discovery that low laser energies in the range of 2-3 microns in wavelength are effective in the lysis of the crystalline lens of the eye and for obliterating membranes in the vitreous cavity strands.

A further object of the invention is to provide a system capable of delivering sufficient laser energy to an eye without encountering problems related to the use of a fluoride glass fiber probe.

A still further object of the invention is the provision of a compound optical fiber having a fluoride glass main portion and a tip portion of a hard, moderately-transparent glass or crystalline fiber so that the poor handling capabilities and the reactive properties and toxicity associated with the fluoride glass can be avoided.

SUMMARY OF THE INVENTION

In accordance with the invention, in a low energy laser system for surgical purposes having a source of pulsed laser energy above 2 microns in wavelength and glass optical fiber means transmissive to the laser energy for delivering sufficient amounts of the laser energy to body tissues for performing delicate surgical procedures wherein the improvement comprises a compound fiber element included in said glass optical fiber means having a body portion of fluoride glass fiber, a tip portion of a hard, moderately-transparent glass or cyrstalline fiber and means for optically coupling the tip portion to the fluoride glass body. A preferred tip portion is composed of quartz-based glass or sapphire.

Also in accordance with the invention, a compound optical fiber assembly for delivering laser energy having a wavelength above about 2 microns for use in surgical procedures comprises an optical fiber body composed of fluoride glass, a surgical optical fiber tip composed of a hard, moderately-transparent glass or crystalline fiber and means for coupling the tip to the fluoride glass body.

For a better understanding of the present invention, reference is made to the following description and accompanying drawings while the scope of the invention will be pointed out in the appended claims.

DESCRIPTION OF THE PREFERRED EMBODIMENTS

A central theme of the present invention is the recognition by the inventors that relatively low energies of lasers in the mid-infrared above (1.8 to 3.3 microns), when pulsed, will liquify a crystalline lens (as present in the eye). A holmium laser, having a wavelength of 2.16 microns, (hereinafter referred to as a 2 micron laser) is one specific laser useful for this purpose. Holmium lasers are constructed by doping a YAG crystal with the lasing species holmium as well as with thulium and chromium sensitizers. Other hosts for holmium (e.g. YLF and YSGG) are possible. The Ho:YAG laser operates at room temperature.

Another laser useful for ophthalmic surgical purposes is the Er:YAG laser having a wavelength of approximately 3 microns.

The energies of both the Ho:YAG laser and the Er:YAG laser are transmissible by known types of glass fibers (fiber optics). For example, fluoride glass fibers, which can transmit energy at these wavelengths are relatively fragile when handled, and, reactive when exposed to water. While the fluoride glass fibers may be jacketed for strengthening and hermetically sealed, the resulting fiber makes the device too large for use in certain delicate medical operations.

The utilization of a short fiber tip of a hard, moderately transparent glass or crystal, such as $OH^-$ free quartz ($SiO_2$) glass or sapphire, coupled to a body of fluoride glass fiber provides a compound optical element capable of delivering laser energies from 2 microns up to 3.3 microns at sufficient energy levels to fragment ocular tissue. While the subsequent discussion will be directed to a silica fiber, it is understood any appropriate hard, moderately-transparent glass or crystalline fiber is included in the inventive scope.

Losses normally associated with quartz fibers are not sufficient to preclude their use in short lengths as a fiber optic tip for insertion in the eye. Quartz ($SiO_2$) is a fiber known to be flexible and rugged, has low transmission loss at visible and near infrared wavelengths and is insoluble and non-toxic when immersed in body fluids. The compound fiber system, then, employs the low attenuating qualities of the fluoride glass fiber for the greater lengths of the fiber assembly with the ruggedness and non-toxicity of the quartz, for the tip.

Figure 1A:
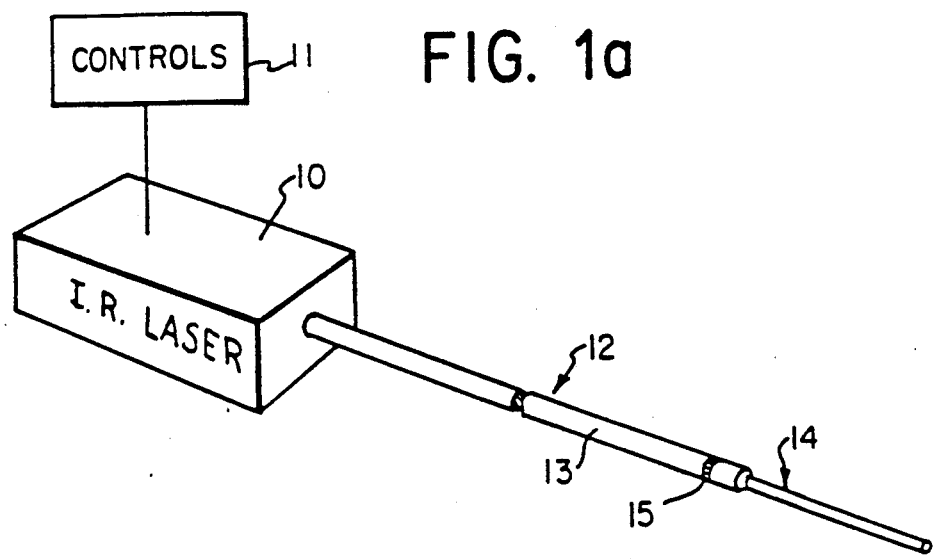
FIG. 1a represents, in partially schematic representation, the laser system of the present invention.

Referring now to FIG. 1a, shown there are the basic elements of the present system wherein an infrared laser 10, such as a Ho:YAG laser operating at 2 microns or, as preferred, an Er:YAG laser operating at 3 microns, provides the source of laser energy for the surgical procedure. The laser 10 is connected to an optical fiber element 12 preferably of the compound kind to be described below. The laser 10 is a pulsed laser and its amplitude, pulse width and pulse repetition rate may be adjusted by suitable controls 11 in a manner known in the art.

Figure 1B:
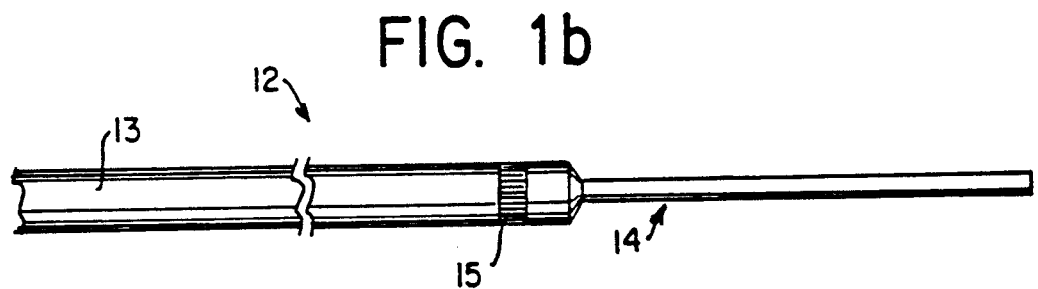
FIG. 1b illustrates, in side view, the compound optical fiber assembly of the present invention.

The compound optical element 12 is shown more specifically in FIG. 1b. There, a body portion 13 is shown which is composed of fluoride glass. This is provided in minimum three to five foot lengths which is sufficient to bring the laser energy to within a few inches of the operating site. It need only be flexible enough for convenience of handling so the limitation to relatively large bend radii (>3 inches) is acceptable. This allows for use of large (~200 $\mu m$) core diameters to minimize the power density on the fiber entrance face and hence maintain it below the damage threshold. Since the fluoride fiber is only used in air, no problems exist with respect to solubility. The fluoride glass body may also be jacketed or sheathed if desired.

The tip of the fiber 14 in FIG. 1b must be a short length if highly attenuating fiber is used, i.e. less than ~15 cm of low $OH^-$ (or $OH^-$ free) silica-based quartz ($SiO_2$) fiber. This length of silica fiber will absorb about 75% of the incident energy. A preferred length of the quartz tip is from 4–8 cm. While the attenuation of the tip is substantial, the energy which is delivered is large enough (because of the cutting efficiency of laser energy having a wavelength of 2–3 microns) to have a useful surgical effect.

The means 15 for connecting the body with the tip may be any known means such as an SMA Multimode In-line Connector GF-25/A sold by Interoptics of Burlingame, CA.

Figure 2:
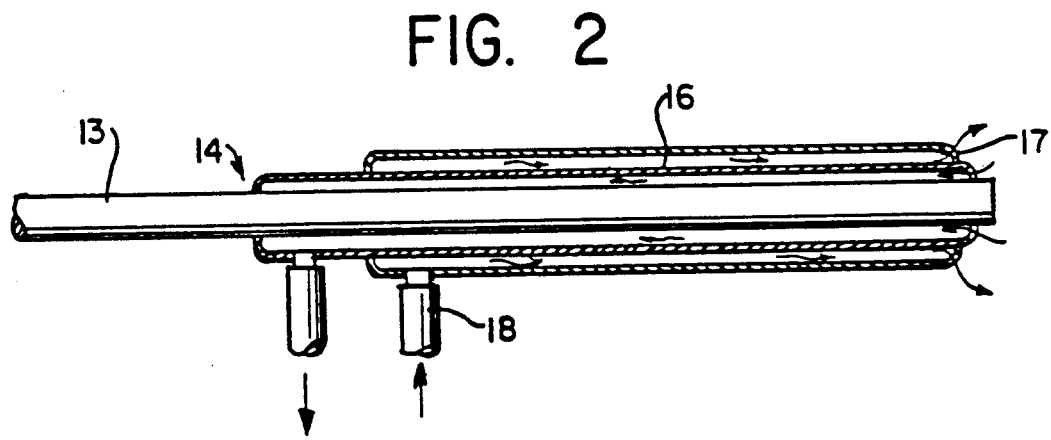
FIG. 2 illustrates, in side view, a form of the compound optical fiber assembly for use in eye surgery.

A practical construction of the tip of the optical element for ophthalmic surgery is shown in FIG. 2. There, the tip includes an irrigation portion 17 coupled to a source of fluid 18 for irrigating the eye and an aspiration portion 16 for removing fragmented particles of a crystalline lens during cataract operations, for example.

It has been found that the compound fiber element is able to deliver at least 200 millijoules of laser energy at a three micron wavelength.

Effective Er:YAG lasers in accordance with the present invention have a preferred repetition pulse rate in the range of 10 Hz, a pulse width in the range of 100 $\mu sec$ and a pulse amplitude in the range of 1 kWatt.

While the ophthalmological operation referred to above is one important application of the laser system employing the compound fiber optic element of the present invention, other applications are readily encompassed by the invention. For example, a laser angioplasty procedure could employ the compound fiber element to guide energy (by way of the silica tip) into an artery which has been exposed and opened during coronary bypass surgery.

While the foregoing description and drawings represent the preferred embodiments of the present invention, it will be obvious to those skilled in the art that various changes and modifications may be made therein without departing from the true spirit and scope of the present invention.

What is claimed is:

1. In a low energy laser system for surgical purposes having a source of pulsed laser energy above 1.8 microns in wavelength and optical fiber means transmissive to said laser energy for delivering sufficient amounts of laser energy to body tissues for performing delicate surgical procedures wherein the improvement comprises a compound fiber element included in said optical fiber means having a body portion of fluoride glass fiber, an elongated tip portion of a hard, moderately-transparent glass or crystalline fiber and means for optically coupling the tip portion to the fluoride glass body.

2. The laser system of claim 1 wherein the tip portion has a maximum length of 15 cm when the material constituting said tip portion is highly attenuating.

3. The laser system of claim 1 wherein the fluoride glass body portion of the compound fiber element is of minimum length from 3 to 5 feet.

4. The laser system of claim 1 wherein the tip portion is from 4–8 cm in length.

5. The laser system of claim 1 wherein the tip is composed of a sapphire-based material.

6. The laser system of claim 1 wherein the tip is composed of a quartz-based material.

7. In a low energy laser system for surgical purposes having a source of pulsed laser energy above 1.8 microns in wavelength and optical fiber means transmissive to said laser energy for delivering sufficient amounts of laser energy to body tissues for performing delicate surgical procedures wherein the improvement comprises a compound fiber element included in said optical fiber means having a body portion of fluoride glass fiber, a tip portion of a hard, moderately-transparent glass or crystalline fiber and means for optically coupling the tip to the fluoride glass body, wherein the tip is composed of OH$^-$ free quartz.

8. In a low energy laser system for surgical purposes having a source of pulsed laser energy above 1.8 microns in wavelength and optical fiber means transmissive to said laser energy for delivering sufficient amounts of laser energy to body tissues for performing delicate surgical procedures wherein the improvement comprises a compound fiber element included in said optical fiber means having a body portion of fluoride glass fiber, a tip portion of a hard, moderately-transparent glass or crystalline fiber, means for optically coupling the tip to the fluoride glass body, and means coupled to said tip of the compound fiber optic element for supplying a source of fluid for irrigation purposes.

9. The laser system of claim 8, further including means coupled to said tip of the compound fiber optic assembly for aspirating eye tissue during surgery.

10. In a lower energy laser system for surgical purposes having a source of pulsed laser energy above 1.8 microns in wavelength and optical fiber means transmissive to said laser energy for delivering sufficient amounts of laser energy to body tissues for performing delicate surgical procedures wherein the improvement comprises a compound fiber element included in said optical fiber means having a body portion of fluoride glass fiber, a tip portion of a hard, moderately-transparent glass or crystalline fiber, means for optically coupling the tip to the fluoride glass body, and means coupled to said tip of the compound fiber optic assembly for aspirating eye tissue during surgery.

11. A compound optical fiber assembly for use in surgical procedures for delivering laser energy having a wavelength above about 1.8 microns comprising:
   an optical fiber body composed of fluoride glass;
   a surgical optical fiber elongated tip portion composed of a hard, moderately transparent glass or crystal; and
   means for optically coupling the tip portion to the fluoride glass body.

12. The assembly of claim 11 wherein said body is encased in a protective sheath.

13. The assembly of claim 11 wherein said body is of minimum length from three to five feet.

14. The assembly of claim 11 wherein said tip has a maximum length of 15 cm when the material constituting said tip portion is highly attenuating.

15. The assembly of claim 11 wherein said tip has a length of from 4–8 cm.

16. The assembly of claim 11 wherein said tip is composed of a sapphire-based material.

17. The assembly of claim 11 wherein said tip is composed of a quartz-based material.

18. A compound optical fiber assembly for use in surgical procedures for delivering laser energy having a wavelength above about 1.8 microns comprising:
   an optical fiber body composed of fluoride glass;
   a surgical optical fiber tip composed of a hard, moderately transparent glass or crystal; and
   means for optically coupling the tip to the fluoride glass body wherein said tip is composed of OH$^-$ free quartz.

* * * * *